United States Patent
Grieser

(10) Patent No.: US 9,511,872 B2
(45) Date of Patent: Dec. 6, 2016

(54) POWER PLANT, AN APPLICATION OF SUCH A POWER PLANT AND A METHOD OF OPERATING SUCH A POWER PLANT

(71) Applicant: AIRBUS HELICOPTERS DEUTSCHLAND GMBH, Donauworth (DE)

(72) Inventor: Wolfram Grieser, Riemerling (DE)

(73) Assignee: Airbus Helicopters Deutschland GmbH, Donauworth (DE)

(*) Notice: Subject to any disclaimer, the term of this patent is extended or adjusted under 35 U.S.C. 154(b) by 320 days.

(21) Appl. No.: 14/083,676

(22) Filed: Nov. 19, 2013

(65) Prior Publication Data
US 2014/0140871 A1 May 22, 2014

(30) Foreign Application Priority Data
Nov. 22, 2012 (EP) .................................. 12400049

(51) Int. Cl.
| | | |
|---|---|---|
| B64D 33/00 | (2006.01) |
| B64C 27/12 | (2006.01) |
| B64C 27/14 | (2006.01) |
| B64C 39/02 | (2006.01) |

(52) U.S. Cl.
CPC ............... B64D 33/00 (2013.01); B64C 27/12 (2013.01); B64C 27/14 (2013.01); B64C 39/024 (2013.01)

(58) Field of Classification Search
CPC ........ B64C 27/14; B64C 27/12; B64C 39/024; B64D 33/00
See application file for complete search history.

(56) References Cited

U.S. PATENT DOCUMENTS

| | | | | |
|---|---|---|---|---|
| 3,362,255 A | * | 1/1968 | De Rocca et al. | B64C 27/12 192/47 |
| 5,271,295 A | * | 12/1993 | Marnot | B64C 27/14 244/58 |
| 6,371,882 B1 | * | 4/2002 | Casey | F16H 3/728 475/2 |
| 8,281,680 B2 | * | 10/2012 | Huang | B60K 1/00 477/15 |

(Continued)

FOREIGN PATENT DOCUMENTS

DE   202008002249   4/2008

OTHER PUBLICATIONS

European Search Report for EP 12400049.8, Completed by the European Patent Office on Apr. 22, 2013, 3 Pages.

*Primary Examiner* — Valentina Xavier
(74) *Attorney, Agent, or Firm* — Brooks Kushman P.C.

(57) ABSTRACT

A mobile power plant having an engine together with a main gear box (5) and a free wheel assembly (4) suitable for driving a rotary wing (7) by means of the main gear box (5) and further having an electric motor-generator (10), wherein the power plant includes an accessory gear box (12), an additional freewheel assembly (11) and a pump (8), said electric motor-generator (10) being mechanically connected in series via said additional freewheel assembly (12) to said main gear box (5) in order to be capable of being driven by said main gear box (5) and said electric motor-generator (10) being connected to said pump (8) in order to be capable of driving said pump (8). The invention relates as well to an application of such a mobile power plant and to a method of operating the mobile power plant.

20 Claims, 1 Drawing Sheet

(56) References Cited

U.S. PATENT DOCUMENTS

| | | | |
|---|---|---|---|
| 2008/0173752 A1* | 7/2008 | Palcic | B64C 27/10 244/17.11 |
| 2011/0121127 A1 | 5/2011 | Certain | |
| 2012/0025032 A1 | 2/2012 | Hopdjanian et al. | |
| 2014/0145028 A1* | 5/2014 | Gomez | B64C 27/12 244/58 |
| 2016/0016670 A1* | 1/2016 | Sautreuil | B64D 27/10 307/9.1 |

* cited by examiner

POWER PLANT, AN APPLICATION OF SUCH A POWER PLANT AND A METHOD OF OPERATING SUCH A POWER PLANT

CROSS REFERENCE TO RELATED APPLICATION

This application claims priority to European patent application No. EP 12 400049.8 filed Nov. 22, 2012, the disclosure of which is incorporated in its entirety by reference herein.

BACKGROUND OF THE INVENTION (1) Field of the Invention

The invention relates to a mobile power plant with the features of the preamble of claim 1, the application of such a mobile power plant with the features of the preamble of claim 9 and a method of operating the mobile power plant with the features of the preamble of claim 12. The invention lies in the technical field of mobile power plants of helicopters.

(2) Description of Related Art

A helicopter is conventionally provided with a rotary wing for providing it with lift and propulsion and with an anti-torque tail rotor for countering the torque exerted by the rotary wing on the fuselage of the helicopter. Furthermore, a helicopter features energy supply systems, e.g., electric, hydraulic, compressors for air-con systems, driven by a drive system of the helicopter. Some of said energy supply systems, e.g., hydraulics, are required to be driven by a rotor drive system to keep them operational also in case of loss of all engines/autorotation, see FAR and CS 27/29.691 and 695. At least bigger helicopters are required by FAR and CS 29,671c to have means to check full availability of the flight controls in their entire range prior to take-off. The transfer of the mechanical rotational power from the engine to the drive system e.g., a main gear box (MGB)—is done via a free wheel mechanism. This allows free rotation of the drive system and rotor, e.g., for autorotation, should the engine fail, see FAR and CS 27/29.691 and 695.

In order to drive the rotary wing, and where appropriate the anti-torque rotor, the helicopter has a power plant.

The power plant implements one or more engines. It should be understood that throughout this specification, the term "engine" applies equally well to turbine engines or to piston engines. The term "engine" is to be contrasted with the term "electric motor", where the term "electric motor" designates a motor driven by electricity, preferably a so-called "brushless" motor for example.

The document US 2011/121127 A1 discloses a power plant having a single engine together with both a main gear box (MGB) suitable for driving the rotary wing of a helicopter and a tail gear box (TGB) suitable for driving an anti-torque rotor of a helicopter. The power plant also includes a first electric motor mechanically connected to said MGB in order to be capable of driving said MGB, and a second electric motor mechanically connected to said TGB in order to be capable of driving said tail gear box.

An object of the present invention is to propose a mobile power plant for the demand for further electrical/hydraulic energy—at least for specific elements/parts. It is a further object of the present invention to propose an application of said mobile power plant for the demand for further electrical energy during the production life of helicopters at least for specific elements/parts of a flight mission. It is a still further object of the present invention to propose a method of operating the mobile power plant with or without engine.

A solution is provided with a mobile power plant with the features of claim 1 of the invention. A further solution for an application of said mobile power plant is provided with the features of claim 9 of the invention. A still further solution for a method of operating said mobile power plant is provided with the features of claim 12 of the invention.

BRIEF SUMMARY OF THE INVENTION

According to the invention a mobile power plant has an engine together with a main gear box and a free wheel assembly suitable for driving a rotary wing by means of the main gear box. The power plant further has an electric motor-generator.

The main gear box includes an accessory gear box, an additional freewheel assembly and a pump as specific elements/parts, said electric motor-generator being mechanically connected in series via said additional freewheel assembly to said main gear box. Said electric motor-generator is driven by said main gear box and said electric motor-generator is connected to said pump in order to drive said pump.

The inventive mobile power plant provides advantages in terms of weight, costs, volume and the inventive mobile power plant provides for other than electric on-board energy. The same energy supply source of the inventive power plant can be driven by the accessory gear box of the inventive power plant during flight and by the electric motor on ground.

The dual use of the electric motor on ground, used also as an additional generator during flight is a further redundancy/diversification of the electric system of the inventive power plant. The inventive power plant allows transfer of ground power to the electric motor-generator and consequently to onboard energy consumers even if the rotor is not turning thus allowing the use of electrical ground power, e. g. for maintenance, ground and pre-flight test purpose and as well for engine start.

Correspondingly hydraulic power might be supplied via ground power for direct supply of onboard hydraulic consumers. For bigger helicopters, i.e., helicopters with more than 3 tons, the inventive power plant improves on-board independent power sources, e.g., electric, hydraulic, pneumatic, air-con, for ground operation.

For said bigger helicopters the inventive power plant further allows use of an electric motor pump/auxiliary pressure supply to pressurise at least one hydraulic circuit to support pre-flight test of the flight controls.

For smaller helicopters, i.e., helicopters with less than 3 tons, the inventive power plant allows on-board use of any electrical engine starter motor(s) as generators as long as the engine(s) are operative by using the battery(s), which are used for engine start up as emergency power source in case of loss of all engines/autorotation.

The inventive power plant features an auxiliary power unit for electrical ground power, if available, for pre-flight test and engine start or in cases where ground power is not available, an on-board battery of the inventive power plant is used for pre-flight test and engine start.

According to a preferred embodiment of the invention an electric engine's starter motor-generator is provided, said electric engine's starter motor-generator being connected to said engine.

According to a further preferred embodiment of the invention said pump is a hydraulic pump, air-conditioning (air-con) compressor, etc. The hydraulic pump of the inventive power plant allows use as a ground/pre-flight test pump or as emergency back-up pump. The hydraulic pumps, air-con systems coupled to the accessory gear box allow operation while the rotary wing is not turning.

According to a further preferred embodiment of the invention said electric motor-generator is provided with electric supply lines for collecting electric power from a ground supply or delivering electric power to electric consumers onboard the helicopter.

According to a further preferred embodiment of the invention said pump is provided with hydraulic supply lines for delivering hydraulic power to hydraulic consumers onboard the helicopter. Said hydraulic power is provided in support of the electric motor-generator.

According to a further preferred embodiment of the invention said accessory gear box is provided with a power outlet, said additional freewheel assembly and said electric motor-generator being mounted to said power outlet. The inventive power plant provides for a 'reserve' drive outlet allowing in case of a later demand—after an original development—on-board energy, e.g., introduction of an air-con.

According to a further preferred embodiment of the invention said engine, the free wheel assembly and the main gear box are mechanically connected in series.

According to a further preferred embodiment of the invention said electric motor-generator is connected to a battery and/or electric onboard consumers.

According to a preferred embodiment of the invention the inventive mobile power plant is applied to a helicopter.

In addition to providing a mobile power plant, the invention also provides a helicopter provided both with a rotary wing and with an anti-torque rotor, and also with a power plant, the power plant being provided with a main gear box driving the rotary wing and a tail gear box driving the anti-torque rotor.

According to a further preferred embodiment of the invention the additional freewheel assembly and the electric motor generator are installed in a position of a hydraulic pump removed from an outlet of the accessory gear box. The hydraulic pump is shifted as much as needed and is reinstalled in an adjacent position allowing connection to the electric motor generator. Hydraulic pump and electric motor generator use a common mechanical accessory gear box drive.

According to a preferred embodiment of the invention a method of operating the inventive mobile power plant comprises the following steps:—providing a battery and/or external electric (ground) supply,—supplying electric power from said battery and/or external electric (ground) supply to said electric motor generator,—driving said pump by means of said electric motor generator, and—driving onboard hydraulic consumers by means of said pump.

According to a further preferred embodiment of the invention a method of operating the inventive mobile power plant comprises the following steps:—driving the rotary wing, said electric motor generator and said pump by means of said main gear box,—supplying electric power from said driven electric motor generator to the battery and/or electric onboard consumers, and—driving onboard hydraulic consumers by means of said pump.

According to a preferred embodiment of the invention a method of operating the inventive mobile power plant comprises the following steps:—driving said electric motor generator and said pump by means of said autorotating rotary wing via said main gear box, accessory gear box and additional freewheel assembly,—supplying preferably electric power from said driven electric motor generator to the battery and/or electric onboard consumers, and—supplying hydraulic power from said driven pump to onboard hydraulic consumers.

A method of operating the inventive mobile power plant comprises the following steps:—providing a hydraulic ground supply, and supplying hydraulic power from said hydraulic ground supply to onboard hydraulic consumers.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

DETAILED DESCRIPTION OF THE INVENTION

Figure 1:
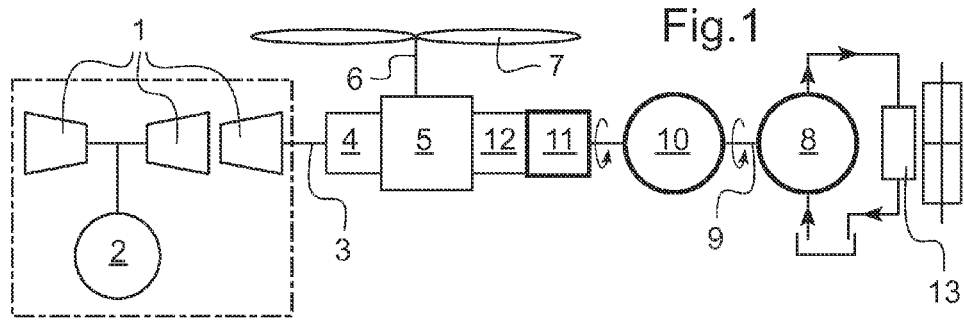
FIG. 1 is a diagram showing a power plant in a first operating mode according to the invention.

According to FIG. 1 a mobile power plant of a helicopter (not shown) is provided with an engine 1. Said engine 1 is connected to an electric engine's starter motor/generator 2. The engine 1 is connected in series via an axle 3 and a free-wheel assembly 4 to a main gear box 5. The main gear box 5 drives a rotary wing 7 at its output 6. During ground and pre-flight test operation the electric engine's starter motor/generator 2 is supplied by electric (ground) power or a battery (not shown). During ground and pre-flight test operation the electric engine's starter motor/generator 2 is operated as an electric motor.

At a further output of the main gear box 5 is provided respectively in series an accessory gear box 12, an additional freewheel assembly 11, an electric motor-generator 10 and a pump 8, e. g. a hydraulic pump. Said pump 8 provides hydraulic pressure to onboard hydraulic consumers 13, such as an air-con compressor, towards one side said electric motor-generator 10 is mechanically connected by means of a drive shaft 9 via said additional freewheel assembly 11 to said main gear box 5. Towards another side said electric motor-generator 7 is connected by means of said drive shaft 9 to said pump 8 for driving said pump 8. The capability of the electric motor-generator 10 is restricted from 10% to 90% of the power transmittable by the additional freewheel assembly 11 in order to keep restricted the volume of the electric motor-generator 10.

The electric engine's starter motor/generator 2 and the electric motor-generator 10 are part of into an electric grid (not shown) with electric consumers, such as the battery, onboard the helicopter.

Figure 4:
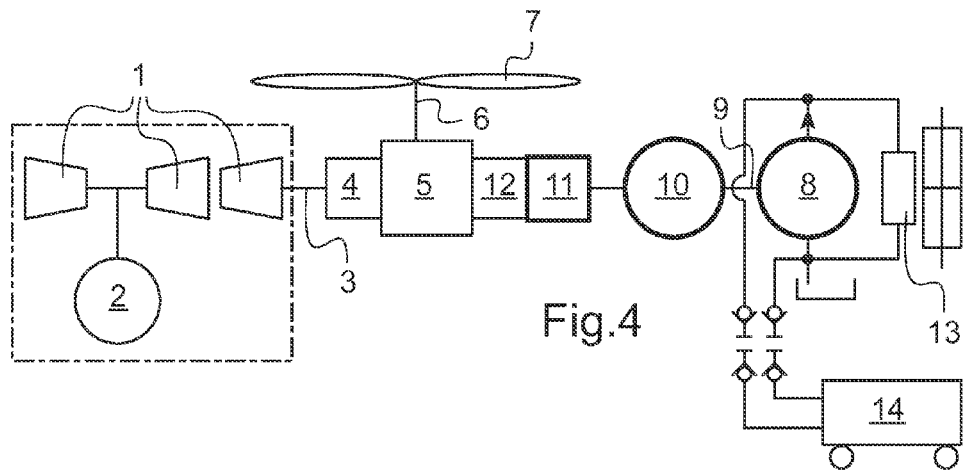
FIG. 4 is a diagram showing the power plant in a fourth operating mode.

An external hydraulic (ground) power 14 is connected to the onboard hydraulic consumers 13 parallel to the pump 8 for supply in support of the electric motor-generator 10 (s. FIG. 4).

Method of Operating the Power Plant

On ground and during pre-flight test operation of the helicopter the engine 1, the main gear box 5 and the rotary wing 7 are stopped. The electric motor-generator 10 is supplied by external electric (ground) power or by battery to drive the electric motor-generator 10 and the pump 8 via the drive shaft 9. During ground and pre-flight test operation the electric motor-generator 10 is operated as a motor driving the pump 8. Said pump 8 provides hydraulic pressure to said onboard hydraulic consumers 13. While the electric motor-generator 10 is driven by the external electric (ground) power or by battery, the drive shaft 9 is separated from the accessory gear box 12 and the main gear box 5 by the freewheel 11 and consequently the main rotor 7 is not driven.

Figure 2:
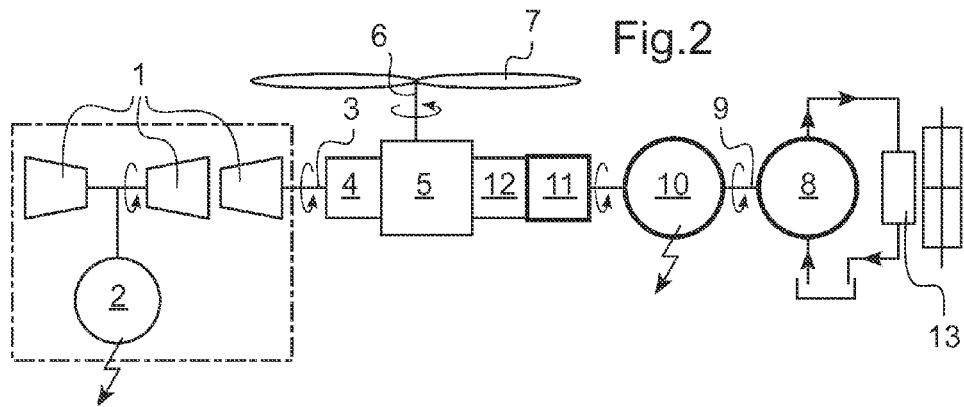
FIG. 2 is a diagram showing the power plant in a second operating mode according to the invention.

According to FIG. 2 during flight operation of the helicopter the running engine 1 drives the electric motor-generator 10 as an electric generator via the main gear box 5, the accessory gear box 12 and the additional freewheel assembly 11, respectively connected by the axle 3. The rotary wing 7 is driven via the main gear box 5 and the output 6. The main gear box 5 and the electric motor-generator 10 drive as well directly and mechanically the pump 8 coupled via the drive shaft 9. During flight operation the driven electric motor-generator 10 feeds any electric on board consumers, e. g. the battery, while the driven pump 8 provides energy to its respective hydraulic consumers 13, e. g. an air con-compressor. The electric engine's starter motor/generator 2 is driven by the engine 1 and feeds the helicopter's electric on board consumers.

The electric motor-generator 10 is provided with a control for electrical balance with the electric engine's starter motor/generator 2 and for separation from the onboard electric grid.

Figure 3:
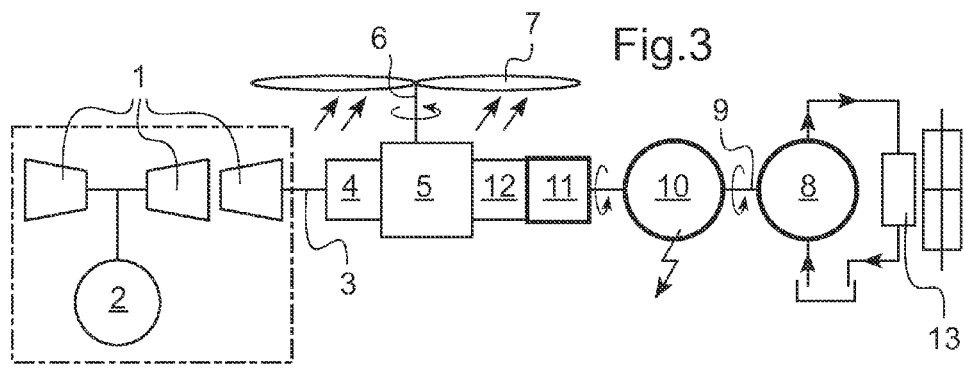
FIG. 3 is a diagram showing the power plant in a third operating mode according to the invention.

According to FIG. 3 during flight, autorotation operation of the helicopter with a non-operating engine 1—due to a technical problem—the rotary wing 7 drives the electric motor-generator 10 as an electric generator via the main gear box 5, the accessory gear box 12 and the additional freewheel assembly 11, respectively connected by the axle 3. The rotary wing 7 is driven by the airstream while the helicopter is descending. The electric motor-generator 10 drives as well directly and mechanically the pump 8 coupled via the drive shaft 9. During autorotation operation the driven electric motor-generator 10 feeds any electric on board consumers, e. g. the battery, while the driven pump 8 provides energy to its respective hydraulic consumers 13, e. g. an air con-compressor.

According to FIG. 4, alternatively, on ground and during pre-flight test operation with stalled engine 1, stalled main gear box 5 and stalled rotary wing 7 of the helicopter, the onboard hydraulic consumers 13 are supplied directly by external hydraulic (ground) power 14 to provide hydraulic pressure to said onboard hydraulic consumers 13.

Application of the Power Plant

For an existing helicopter with a hydraulic pump at the power outlet (not shown) of the accessory gear box 12, said hydraulic pump is to be removed from the power outlet. An additional freewheel assembly 12 and an electric motor generator 10 are installed in the hydraulic pump's former position. The hydraulic pump is to be shifted as much as needed and is to be reinstalled in an adjacent position allowing connection to the electric motor generator 10. Hydraulic pump and electric motor generator use a common mechanical drive of the accessory gear box 12.

LIST OF REFERENCES 1 engine
2 electric engine's starter motor/generator
3 axle
4 free-wheel assembly
5 main gear box
6 output
7 rotary wing
8 pump
9 drive shaft
10 electric motor generator
11 additional freewheel assembly
12 accessory gear box
13 onboard hydraulic consumer
14 external hydraulic (ground) power

What is claimed is:

1. A mobile power plant having an engine together with a main gear box and a free wheel assembly suitable for driving a rotary wing by means of the main gear box and further having an electric motor-generator, wherein supplemental to the main gear box there is provided an accessory gear box, an additional freewheel assembly and a pump, the electric motor-generator being on a first side mechanically connected in series via the additional freewheel assembly and the accessory gear box to the main gear box in order to be capable of being driven by the main gear box and the electric motor-generator being mechanically connected on a second side to the pump.

2. The power plant according to claim 1, further comprising an electric engine's starter motor-generator connected to the engine.

3. The power plant according to claim 1, wherein the pump is a hydraulic pump that provides hydraulic pressure to an onboard hydraulic consumer including an air-con compressor.

4. The power plant according to claim 1, wherein the electric motor-generator is provided with electric supply lines.

5. The power plant according to claim 1, wherein the pump is provided with hydraulic supply lines.

6. The power plant according to claim 1, wherein the accessory gear box is provided with a power outlet, the additional freewheel assembly and the electric motor-generator being mounted to the power outlet.

7. The power plant according to claim 1, wherein the engine, the free wheel assembly and the main gear box are mechanically connected in series.

8. The power plant according to claim 1, wherein the electric motor-generator is connected to a battery and/or electric onboard consumers.

9. An application of the mobile power plant according to claim 1 to a helicopter.

10. The application according to claim 9, wherein the additional freewheel assembly and the electric motor generator are installed in a position of a hydraulic pump removed from an outlet of the accessory gear box, while the hydraulic pump is shifted and is reinstalled in an adjacent position allowing connection to the electric motor generator.

11. The application according to claim 10, wherein the hydraulic pump and electric motor-generator use a common drive shaft to the accessory gear box.

12. A method of operating onboard a helicopter the mobile power plant according to claim 1 with the following steps:
providing the additional freewheel assembly and the accessory gear box for connecting in series the electric motor-generator and the main gear box,
providing electric power to the electric motor generator, the electric motor-generator being driven by the main gear box,
driving the pump by means of the electric motor-generator, and, driving onboard hydraulic consumers by means of the pump.

13. The method of operating the power plant according to claim 12, wherein: the step of providing electric power to the electric motor-generator includes providing the electric power from the battery and/or an external electric (ground) supply.

14. The method of operating the power plant according to claim 12, wherein:
the step of driving the pump by means of the electric motor-generator is achieved by means of driving the auto-rotating rotary wing via the main gear box.

15. The method of operating the power plant according to claim 14, wherein:
the step of providing electric power is achieved by providing the electric power from the electric motor-generator to the battery and/or one or more electric onboard consumers.

16. A mobile power plant for a helicopter comprising:
a main gear box to drive a rotary wing;
an engine drivably connected to the main gear box via a freewheel assembly;
an electric motor-generator having a first side opposite to a second side;
an accessory gear box and another freewheel assembly positioned between and mechanically connecting the main gear box and the first side of the electric motor-generator such that the main gear box is capable of driving the electric motor-generator; and
a pump mechanically connected to the second side of the electric motor-generator;
wherein the accessory gear box, the another freewheel, the electric motor-generator, and the pump are mechanically connected in series with one another.

17. The mobile power plant of claim 16 wherein the accessory gear box, the another freewheel, the electric motor-generator, and the pump are mechanically connected in sequential order.

18. The mobile power plant of claim 16 further comprising a driveshaft mechanically connecting electric motor-generator to the accessory gear box, the driveshaft connecting the electric motor-generator to the pump to drive the pump.

19. The mobile power plant of claim 18 wherein the electric motor-generator and the pump rotate about a common axis of the driveshaft.

20. A method of operating a helicopter comprising:
driving an electric motor-generator via one of battery power and ground power to drive a pump when the helicopter is on ground and during pre-flight test operation and when a main gear box and a rotary wing are stopped, wherein an engine is drivably connected to the main gear box via a freewheel assembly, and wherein the main gear box, an accessory gear box, another freewheel, the electric motor-generator, and the pump are mechanically connected in series and sequentially;
driving the electric motor-generator via the engine to generate electric power and to drive the pump when the helicopter is in flight operation and the engine is driving the main gear box to drive a rotary wing; and
driving the electric motor-generator via the main gear box with the rotary wing in autorotation and the engine non-operating to generate electric power and to drive the pump.

\* \* \* \* \*